Dec. 19, 1933.    J. F. PETERS    1,939,723
SOLDERING MACHINE
Filed Oct. 23, 1930    3 Sheets-Sheet 1

Dec. 19, 1933.   J. F. PETERS   1,939,723
SOLDERING MACHINE
Filed Oct. 23, 1930   3 Sheets-Sheet 3

INVENTOR
John F. Peters
BY
John C. Carpenter
ATTORNEY

Patented Dec. 19, 1933

1,939,723

UNITED STATES PATENT OFFICE 1,939,723

SOLDERING MACHINES

John F. Peters, Leonia, N. J., assignor to American Can Company, New York, N. Y., a corporation of New Jersey Application October 23, 1930. Serial No. 490,673

1 Claim. (Cl. 113—61)

The present invention relates to soldering machines such as are commonly used in conjunction with can body makers and has particular reference to machines having supporting and guiding mechanism for the can bodies while being soldered and utilizing a cooling medium for reducing the temperature imparted to the apparatus by the solder applied to the side seam of the can body from a bath of molten solder.

The present invention is an improvement on the soldering machine of the J. A. Murch Patent No. 1,639,955, issued August 23, 1927 by the United States Patent Office. In some localities it has been found that the cost of the cooling medium (usually water) is too great to permit the use of a fresh supply of water for cooling purposes and even in cases where the water cost is not so great it is nevertheless expensive.

The present invention is adapted to perform its work in a similar manner to that of the Murch machine and at a greatly reduced cost. It contemplates a closed or self-contained circulatory system of the cooling medium, this circulation being automatically maintained in the system, when the soldering machine is in operation, by means of the principle of convection.

The principal object of the present invention is the provision of a self-contained circulatory cooling system in a soldering mechanism.

An important object of the invention is the provision of a self-contained circulatory cooling system in a soldering mechanism wherein the cooling medium is cooled for reuse.

A further important object of the invention is the provision of an automatically operating cooling system in a soldering mechanism which is dormant when the soldering mechanism is not in use and which automatically operates during operation of the soldering mechanism.

Numerous other objects of the invention, such as means for causing the flow of relatively large bodies of cooling fluid in paths which conform closely with the surfaces of the can bodies, will be apparent as it is better understood from the following description, which, taken in connection with the accompanying drawings, discloses a preferred embodiment thereof.

Referring to the drawings.

Figure 1:
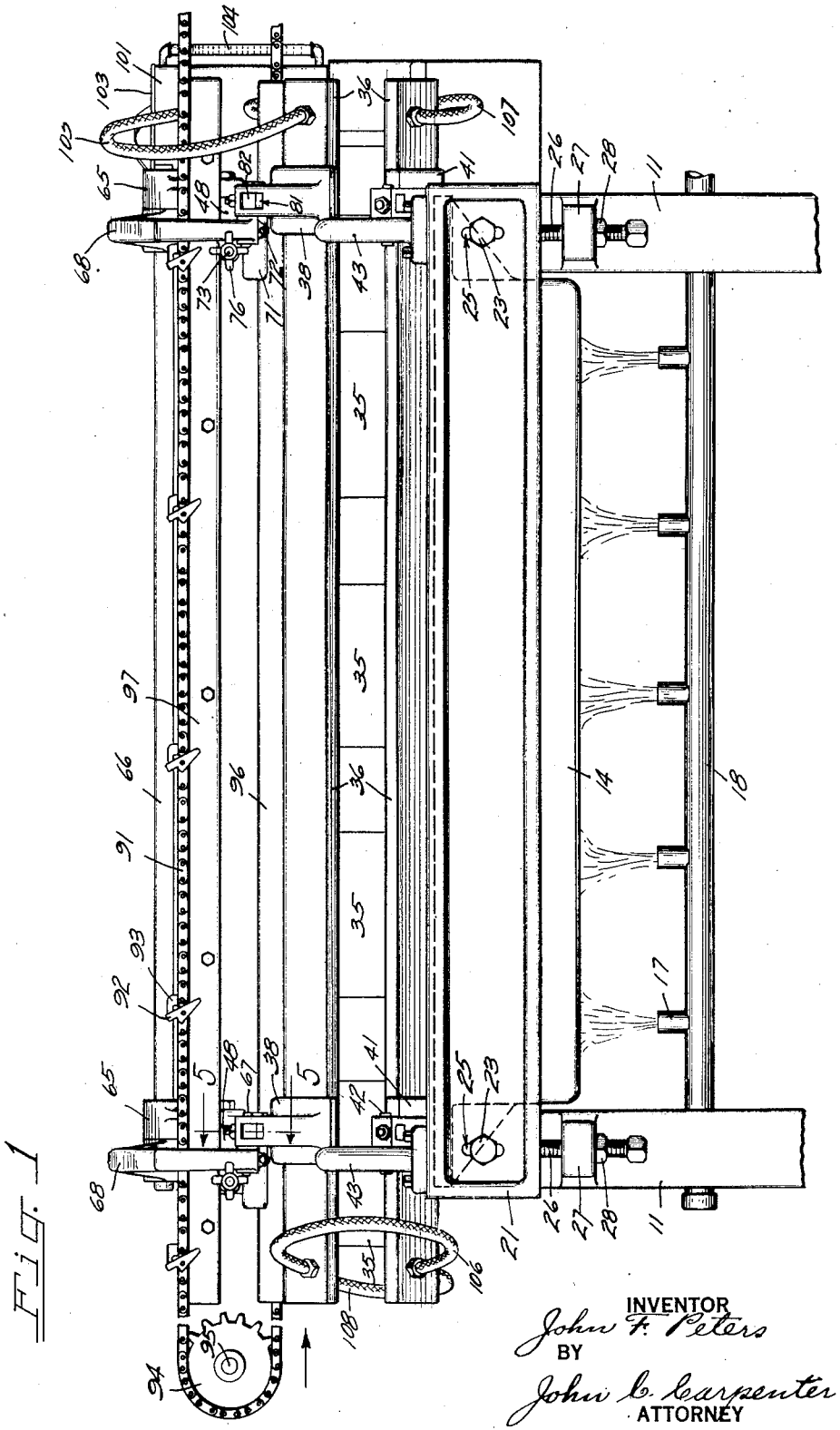
Figure 1 is a side elevation of a portion of a soldering machine in which the present invention is embodied.

The drawings illustrate the preferred manner of applying the principles of the present invention, the reference character 11 indicating a plurality of uprights or legs formed at their top ends with a cross frame 12 within which is disposed an elongated solder bath 14 in which a solder applying roll 15 (Fig. 2) rotates in a bath 16 of molten solder. The solder is heated in any suitable or preferred manner, as by means of burners 17 positioned beneath the bath and connected with a fuel supply pipe 18. The solder roll 15 is constantly rotated within the bath of solder 16 in the usual manner.

The frames 12 are joined by front and rear channel members 21 and 22, secured in place by bolts 23 and 24. The channel members 21 and 22 may be adjusted vertically of the frames 12, being slotted as at 25 to accommodate different relative positions of the bolts 23 and 24.

The channel members 21 (Figs. 1 and 2) rest upon adjusting bolts 26 threadedly engaged in lugs 27, formed on the uprights 11, the bolts 26 being held in adjusted position by locknuts 28. When this vertical adjustment of the channel members 21 and 22 is made, the bolts 23 and 24 are loosened sufficiently to permit movement of the channel members on the uprights, the former being brought to proper vertical position by the adjusting bolts 26. When in an adjusted position the channel members are locked on the uprights by tightening of the bolts 23 and 24.

Figure 2:
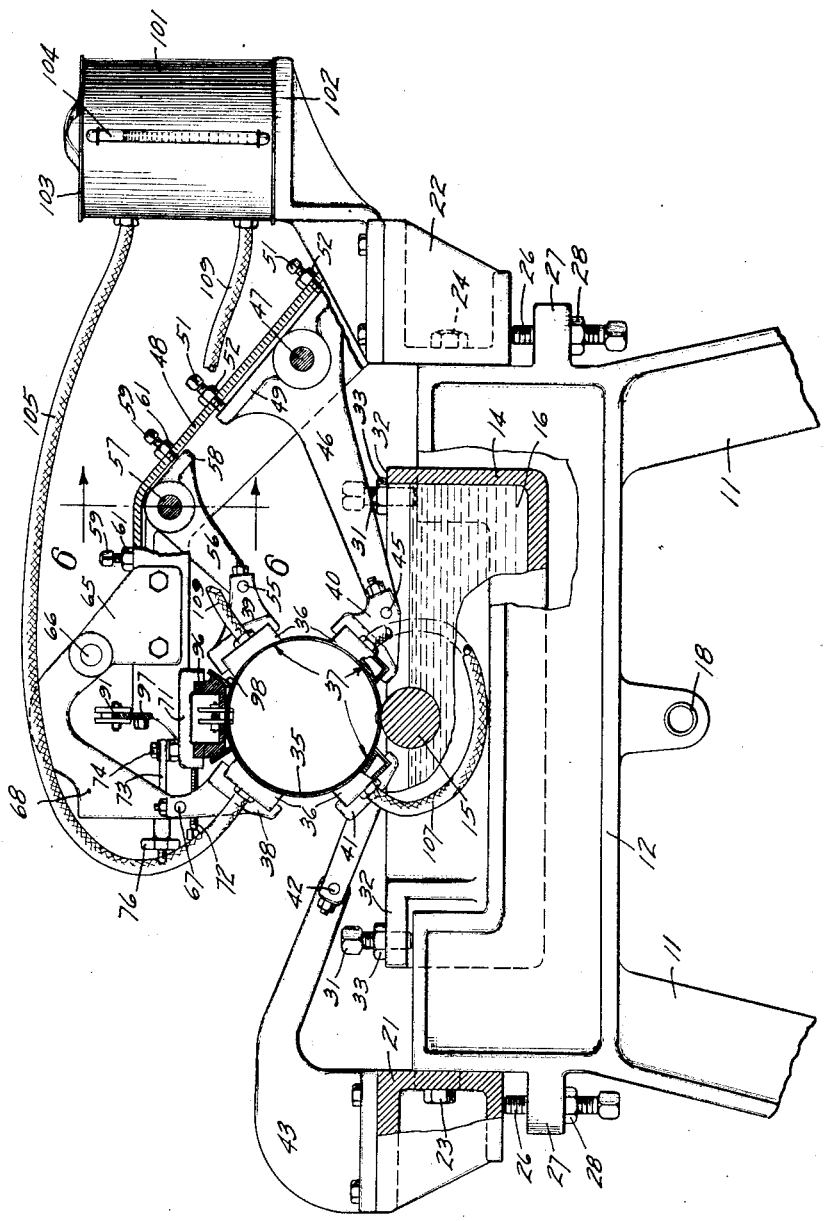
Fig. 2 is an end elevation of the machine, with parts broken away and parts illustrated in section.

The solder bath 14 is adjustably held within the frames 12 as illustrated in Fig. 2, by adjusting screws 31 threadedly engaging flanges 32 extending out from the ends of the bath, these screws resting directly on the frames 12. When in adjusted position the screws 31 are clamped firmly in place by locknuts 33.

Can bodies 35 are moved longitudinally of the solder roll 15 and are guided and supported by a solder horn which comprises longitudinal hollow pipes or rails 36 having inner faces 37 shaped to form a pass for the can bodies. The rails 36 are held in jaws 38, 39, 40, 41 which in turn are adjustably held to space the rails relative to each other so as to provide a passageway for the passing can bodies 35 as they are moved along the solder roll 15.

In the drawings there is illustrated two complete sets of jaws, one set for each end of the solder horn. Intermediate sets may further be provided if the solder horn requires further support. This will depend upon its length.

Each jaw 41 pivotally connects at 42 to the inner end of a bracket 43 mounted on the channel member 21. In a similar manner each jaw 40 pivotally connects at 45 to the inner end of an arm 46, which is pivotally mounted on a shaft 47 carried by a bracket 48 secured to the channel member 22. Each arm 46 is provided with extensions or feet 49 extending on opposite sides of the shaft 47, which are engaged by adjusting bolts 51 threadedly secured in the bracket 48. There are two bolts 51 for each arm 46 and these cooperate to hold the arm in a fixed position relative to the bracket 48. Locknuts 52 threadedly engaging the bolts 51 hold the same in fixed position.

In a similar manner each jaw 39 is pivotally connected at 55 to the forward end of an arm 56 pivotally mounted on a shaft 57 carried by the bracket 48. Each arm 56 is provided with extensions or feet 58 extending on opposite sides of the shaft 57 and these feet are engaged by adjusting bolts 59 threadedly secured in the bracket 48. Cooperative action of the bolts holds the arm 56 in adjusted position. Locknuts 61 threadedly engaging the bolts 59 hold the arm 56 in its fixed position.

Each bracket 48 carries plates 65 between which a cross shaft 66 is supported. This shaft is used as a pivot on which a part of the solder horn may be rotated as will now be described. Each jaw 38 is pivotally connected at 67 to one end of an arm 68 which is pivotally mounted on the shaft 66. By means of this pivotal construction of the arms 68 on the shaft 66, and the rail 36 carried in the jaws 38 and the arms 68 may be swung out of operating position to permit access to the can bodies or to the interior mechanism of the solder horn.

Figure 3:
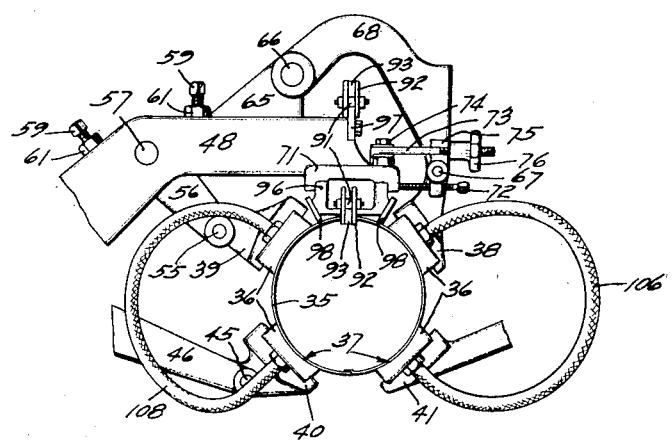
Fig. 3 is a fragmentary elevation of the opposite end of a part of the apparatus.
Figure 4:
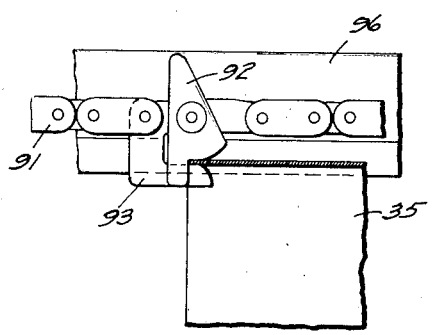
Fig. 4 is a detail view of a portion of the conveyor showing one of the holding links in engagement with the can body which is fragmentarily shown in section.

For the purpose of holding the arms 68 and parts carried thereby in their operating position, the brackets 48 are extended at their outer ends into the form of jaws 71 which among other purposes, hereinafter described, provide abutments for adjusting screws 72 threadedly carried by the jaws 38. As illustrated in Figs. 2 and 3, when the arms 68 and their jaws 38 are in their operating positions, each adjusting screw 72 engages the edge of its associated jaw 71 and forms a stop for the pivotal parts which determines the innermost position of the rail 36 carried by the jaws 38.

Provision is made for normally holding the arms 68 in this closed or operating position, this comprising a locking bolt 73 pivoted at 74 on each jaw 71 and adapted to engage within a slotted lug 75 projecting from one side of each arm 68. With the arms 68 in this position each bolt 73 is swung around on its pivot and moved into its slotted lug 75 whereupon a handnut 76, threadedly mounted upon each bolt 73, is tightened against its lug 75 clamping the parts in operating position.

Figure 5:
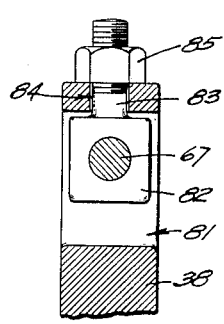
Fig. 5 is an enlarged sectional detail taken substantially along the line 5—5 in Fig. 1.
Figure 6:
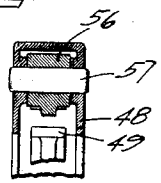
Fig. 6 is a fragmentary detail partly in section taken substantially along the line 6—6 in Fig. 2.

The pivotal connections 42, 45, 55, 67 are of a novel construction to permit close and accurate adjustment of the jaws 41, 40, 39, 38 relative to their respective supporting arms 43, 46, 56, 68. All of these connections are practically identical and for the purpose of illustration, a jaw 38 and its associated pivot pin 67 is selected as an example. This is shown in detail in Fig. 5 and reference should now be had thereto.

The jaw 38 is provided with a slot 81 adjacent its pivotal end and is adapted to house a head 82 of a bolt 83 which extends through a slot 84 cut in the jaw. The pivot pin 67 is held in fixed position in its supporting arm, this being arm 68 as at present considered, and the jaw 38 moves around this fixed pivot into adjusted position. The jaw 38 is then locked firmly in place on its pivot pin 67 by a locknut 85 threadedly mounted on the bolt 83 exterior of the jaw.

For the purpose of propelling the can bodies 35 through the guideway formed by the rails 36, a conveyor chain 91 is provided and equipped with cooperating can body engaging members 92 and 93, mounted at intervals along the length of the chain. This chain is driven in any suitable and preferred manner which may be by means of sprockets connected with the body making machine or with the forward end of the soldering machine. The opposite end of the chain may operate over an idler sprocket 94 mounted on a horizontal shaft 95, supported in any suitable manner. This conveyor chain 91 with its can body engaging members 92 and 93 clamping the can bodies to the chain, moves them above and longitudinally of the solder roll 15 with their side seams closely adjacent the roll and in this passage the can bodies receive the molten solder in the seams in the usual manner.

The lower flight of the chain 91 (Figs. 2 and 3) is supported in guide channels 96 carried by the jaws 71 of the brackets 48 and the upper flight of the chain passes along a supporting rail 97 mounted on the brackets 48. These members 96 and 97 guide the chain in a proper line of travel and insure easy passage of the can bodies 35 between the rails 36. Other guide rails 98 carried on the channels 96 and engaging the upper portion of the can bodies assist in this travel.

The molten solder from the solder bath heats the can bodies and these by conduction transfer their heat to the rails 36 which in turn conduct heat into connected parts of the apparatus. It is to reduce this heat in the soldering machine and also to some extent in the can bodies that the rails 36 are hollow and are adapted to carry a cooling medium, such as cold water, as a part of a closed circulating system. Such a system, as set forth in the following description, permits reuse of the water and allows convection currents, set up in the water by the conducted heat, to maintain a circulation through the rails 36 and through other parts of the cooling apparatus contained in the system just as long as the machine is operating or in other words as long as heat changes take place.

For this purpose there is provided a cooling tank 101 mounted on a bracket 102 bolted to the channel member 22 (Figs. 1 and 2). This tank 101 is provided with a suitable cover 103 which may be removed to permit filling of the tank with water. A glass level gage 104 located on the outside of the tank provides a convenient check on the amount of water in the tank.

Tank 101, as disclosed in Fig. 2, is located, for the most part, above the rails 36 to aid in the circulation of the cooling medium. A flexible pipe 105 connects the upper section of the tank with one of the upper rails 36, this connection being made at the front end of the apparatus. In Figs. 1 and 2, this pipe 105 is shown elevated to a position about the top of the tank 101, this being merely a fanciful showing of the pipe to avoid interference, in the drawings, with other parts of the mechanism. In an actual installation of the machine this pipe is at a much lower level. At the opposite or rear end, a flexible pipe 106 connects this upper rail with the lower rail directly beneath it (see Figs. 1 and 3).

At the forward end of this lower rail a flexible pipe 107 (Fig. 2) connects with the forward end of the opposite lower rail. At the opposite or rear end of this latter lower rail a flexible pipe 108 (Figs. 1 and 3) forms a connection with the upper rail directly above. At the forward end of this upper rail, a connecting pipe 109 (Fig. 2) leads back to the cooling tank 101.

As the passing can bodies 35 are conveyed along the rails 36, the engaging surfaces 37 absorb a certain amount of the heat in the body and this is absorbed by the water within the rails. As the water becomes heated it naturally rises and passing from rail to rail and through the entire length of each rail as made necessary by the positions of the connecting pipes as just described, eventually circulates through the system and passes through the pipe 105 and into the top of the cooling tank 101. This heated water is replaced by relatively colder water from the cooling tank 101 which enters the horn by way of the pipe 109.

In this way, constant heating of the water in the rails causes circulation by convection and the water slowly passes around the system and through the cooling tank 101. The tank and the connecting pipes by conducting the water away from the heated walls of the rails 36 and adjacent the cooler air of the room thus provides a self-contained, circulating system for the soldering apparatus. When heating of the water stops and the temperature throughout the system becomes equalized, circulation of the water automatically ceases and therefore the improved system is self-operating and requires no attention other than a proper supply of water. Evaporation by reason of the tank and pipes being substantially closed takes place very slowly and the water supply required is greatly conserved.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a soldering apparatus the combination of body feeding mechanism, soldering means, and means for holding and causing the flow of relatively large bodies of cooling fluid in paths which conform in close contiguity and parallelism, both longitudinally and circumferentially, with the outside surfaces of the can bodies, said means consisting of hollow bodies each shaped to form an outside horn element conforming closely with the can bodies longitudinally and circularly and within which the can bodies are fed and slide, whereby the bodies of fluid are shaped and caused to flow so as to substantially conform closely with the surfaces of the can bodies.

JOHN F. PETERS.